US012596928B2

(12) United States Patent
Chauhan et al.

(10) Patent No.: US 12,596,928 B2
(45) Date of Patent: Apr. 7, 2026

(54) MOVEMENT OF TENSOR DATA DURING RESHAPE OPERATION

(71) Applicant: Google LLC, Mountain View, CA (US)

(72) Inventors: Arun Chauhan, Belmont, CA (US); Fatih Mehmet Bakir, Santa Barbara, CA (US); Phitchaya Mangpo Phothilimthana, Mountain View, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 895 days.

(21) Appl. No.: 17/792,117

(22) PCT Filed: Mar. 30, 2020

(86) PCT No.: PCT/US2020/025676
§ 371 (c)(1),
(2) Date: Jul. 11, 2022

(87) PCT Pub. No.: WO2021/201821
PCT Pub. Date: Oct. 7, 2021

(65) Prior Publication Data
US 2023/0052942 A1        Feb. 16, 2023

(51) Int. Cl.
*G06N 3/082* (2023.01)

(52) U.S. Cl.
CPC .................................... *G06N 3/082* (2013.01)

(58) Field of Classification Search
None
See application file for complete search history.

(56) References Cited

U.S. PATENT DOCUMENTS

| | | | |
|---|---|---|---|
| 2017/0053676 A1* | 2/2017 | Marchese | G11B 27/28 |
| 2017/0116037 A1* | 4/2017 | Li | G06F 9/4893 |
| 2018/0285727 A1* | 10/2018 | Baum | G06N 3/063 |
| 2018/0322382 A1 | 11/2018 | Mellempudi et al. | |
| 2018/0324393 A1* | 11/2018 | Ryan | H04N 7/188 |
| 2019/0042221 A1 | 2/2019 | Krishnaiyer et al. | |
| 2019/0042925 A1* | 2/2019 | Choe | G06N 3/063 |
| 2020/0042856 A1* | 2/2020 | Datta | G06N 3/045 |
| 2021/0074270 A1* | 3/2021 | Ahn | G06N 3/045 |

OTHER PUBLICATIONS

Dai et al., "On solving multi-commodity flow problems: An experimental evaluation." Chinese Journal of Aeronautics 30.4, Jun. 2017, 1481-1492.
International Preliminary Report on Patentability in International Appln. No. PCT/US2020/025676, mailed on Oct. 13, 2022, 12 pages.
International Search Report and Written Opinion in International Appln. No. PCT/US2020/025676, mailed on Dec. 23, 2020, 18 pages.

* cited by examiner

*Primary Examiner* — Mark D Featherstone
(74) *Attorney, Agent, or Firm* — Fish & Richardson P.C.

(57) ABSTRACT

A method of performing a reshape operation specified in a reshape layer of a neural network model is described. The reshape operation reshapes an input tensor with an input tensor shape to an output tensor with an output tensor shape. The tensor data that has to be reshaped is directly routed between tile memories of the hardware accelerator in an efficient manner. This advantageously optimizes usage of memory space and allows any number and type of neural network models to be run on the hardware accelerator.

16 Claims, 12 Drawing Sheets

156
*TABLE WITH TRIPLETS*

| 302 CHUNK OF TENSOR DATA | 304 ORIGIN TILE MEMORY | 306 DESTINATION TILE MEMORY |
|---|---|---|
| C1 | N0 | N7 |
| C2 | N6 | N2 |
| C3 | N7 | N5 |
| C4 | N2 | N3 |
| C5 | N7 | N5 |
| ... | ... | ... |
| Cn | Nx | Ny |

FIG. 3

_PRE-PROCESSING BY CPU_

402 IDENTIFY TRIPLETS WHERE DATA HAS TO BE MOVED TO MEMORIES IN ADJACENT TILES

404 INITIATE TRANSFER DATA FOR IDENTIFIED TRIPLETS

406 UPDATE TABLE OF TRIPLETS BY REMOVING THOSE TRIPLETS FOR WHICH DATA HAS BEEN TRANSFERRED

158
*UPDATED TABLE*

| CHUNK OF TENSOR DATA | ORIGIN TILE MEMORY | DESTINATION TILE MEMORY |
|---|---|---|
| C1 | N0 | N7 |
| C2 | N6 | N2 |
| C3 | N7 | N5 |
| C5 | N7 | N5 |
| ... | ... | ... |
| Cn | Nx | Ny |

FIG. 5

SOLVING BY CONSTRAINT BASED SOLVER

RECEIVE, FROM COMPILER, NUMBER OF TILES, MAXIMUM TIME STEPS, UPDATED TABLE OF TRIPLETS (ORIGIN TILE, DESTINATION TILE, CHUNK)

602

PROGRAM SOLVER WITH CONSTRAINTS FOR SOLVING

604

GENERATE SCHEDULE BASED ON NUMBER OF TILES, MAXIMUM TIME STEPS, UPDATED TABLE OF TRIPLETS (ORIGIN TILE, DESTINATION TILE, CHUNK) AND CONSTRAINTS

606

164
*SCHEDULE*

704    MEMORIES WITHIN HARDWARE ACCELERATOR

702    TIME STEPS

FIG. 7

*POST-PROCESSING BY COMPILER*

RECEIVE SCHEDULE — 802

IDENTIFY CYCLES IN CHUNK MOVEMENT ROUTES — 804

REMOVE CYCLES TO UPDATE SCHEDULE — 806

IDENTIFY CHUNKS TO BE TRANSFERRED TOGETHER ON A SINGLE ROUTE BETWEEN TWO MEMORIES IN ANY TIME STEP — 808

MERGE CHUNK DATA TO BE TRANSFERRED OVER SAME ROUTE (THEREBY REMOVING REPETITIVE ROUTES) TO UPDATE SCHEDULE — 810

COMPILATION AND TRANSMISSION OF COMPILED RESULT TO ACCELERATOR

1102 COMPILE DATA BASED ON MODIFIED SCHEDULE

1104 TRANSMIT COMPILED DATA TO ACCELERATOR (COMPILED DATA INCLUDES INSTRUCTIONS FOR (a) EXECUTING TRANSFER OF CHUNKS OF TENSOR DATA BASED ON MODIFIED SCHEDULE AND (b) CREATING MEMORY BUFFERS TO TEMPORARILY STORE CHUNKS)

MOVEMENT OF TENSOR DATA DURING RESHAPE OPERATION

CROSS-REFERENCE TO RELATED APPLICATION

This application is a National Stage Application under 35 U.S.C. § 371 and claims the benefit of International Application No. PCT/US2020/025676, filed on Mar. 30, 2020. The disclosure of the prior application is considered part of and is incorporated in its entirety by reference in the disclosure of this application.

TECHNICAL FIELD

The subject matter described herein relates generally to implementing neural network models on a special-purpose accelerator, and more specifically to movement of tensor data within the accelerator for a reshape operation.

BACKGROUND

A neural network model generally has several layers. When data is input into a neural network model, the data goes through a layer, which produces an output, which goes through the next layer, and so on. The neural network model can have dozens to hundreds of layers. Some layers may perform some computations (e.g., matrix computations), and other layers may simply move (e.g., shuffle) data around. One such layer that simply moves data around is a reshape layer. The reshape layer can vary the layout in which elements of a tensor are presented. For example, 200 elements in 10×20 matrix can be interpreted as same 200 elements in 5×40 matrix (which is a flatter or longer matrix). Modifying the 10×20 matrix into the 5×40 matrix is referred to as a reshape operation.

SUMMARY

When reshaping of a tensor is performed by a reshape layer of a neural network model, the data that has to be reshaped can be collected from several memories of a hardware accelerator into a single memory, and then the collected data can be retrieved from the single memory and redistributed amongst memories of the hardware accelerator in accordance with the desired reshape. That single memory may thus need to have a dedicated memory space to be used for the purpose of reshaping tensors. However, using a single memory and a dedicated memory space only for only reshaping operations can be computationally expensive and unnecessary, in view of the following reasons. Different tensors that are to be reshaped can have different number of dimensions, and each dimension can have different number of elements. For smaller tensors, the single memory may be sufficient to store all the data of those tensors, but memory space in that memory may undesirably remain unutilized. For larger tensors, the single memory may not be sufficient to store all the data of those tensors, and thus many types of neural network models where large tensors are to be reshaped may not be able to run.

The reshape may be an issue for hardware accelerators, e.g., TPUs or other special-purpose chips for performing neural network computations, but not for general purpose central processing units (CPUs) in view of the following. On general purpose CPUs, the tensors are stored in a single memory that is shared by and is addressable by all the cores. Reshaping simply changes the way the tensor is interpreted, without requiring any movement of data within the memory. On the other hand the different accelerator cores, also referred to as tiles, generally do not share a common memory. Instead, each tile has its own local memory. As a result, the tensor is divided (e.g. shared or distributed) across the tile memories. The tensor is distributed such that each tile may perform its computations locally, i.e., without needing data from other tiles. The distribution is also done in such a way that all tiles have an approximately equal amount of work to perform on their respective portions of the tensor. After reshaping such a distributed tensor, the new tensor, in general, no longer satisfies these two conditions of local computations and equal amount of computation. Therefore, the tensor must be redistributed so that the operations on the reshaped tensor may continue to be local and evenly divided across the tiles. Thus, although the reshape operation does not require moving data within the memory when performed by a CPU, the reshape operation can require significant data movement between memories of different tiles when performed by a hardware accelerator. Conventionally, performing this data movement may involve moving the entire tensor to a single memory and then distributing the portions of the tensor to different memories of different tiles. However, the tensors to be reshaped can be large, and any single memory on the accelerator may be relatively smaller than the common memory on a CPU. Therefore, moving the entire tensor to a single memory may not be feasible, e.g., if no memory has enough space to store the entire tensor, or may result in memory space being underutilized, e.g., because memory space is reserved for storing the tensor.

To prevent the problems of underutilization of memory space or lack of memory space for performing reshape operations, and thus allowing all types of neural network models to run on the hardware accelerator efficiently, the tensor data that has to be reshaped does not need to be stored in and collected from a single memory with dedicated memory space, and instead such data can be directly routed between memories of corresponding computing units (e.g., between memories of a source computing unit and a target computing unit) of the hardware accelerator in an efficient manner. The architecture described herein can thus, advantageously, not only improve usage of memory space (e.g., prevent wastage of memory space), but also allow any number and type of neural network models to be run on the hardware accelerator.

In one aspect, a method of performing a reshape operation specified in a reshape layer of a neural network model is described. The reshape operation is configured to reshape an input tensor to an output tensor. The input tensor and the output tensor are transmitted to a reshape solver. The following is received from the reshape solver: data identifying (a) chunks of tensor data to be moved within memories of a hardware accelerator, (b) a source computing unit on the hardware accelerator from where each corresponding chunk is to be moved, and (c) a target computing unit on the hardware accelerator to where each corresponding chunk is to be moved. The received data and a maximum number of time steps over which the reshape operation is to be performed are transmitted to a constraint based solver. A schedule based on the received data, the number of computing units within the hardware accelerator, and the maximum number of time steps are received from the constraint based solver. The schedule is compiled to generate compiled data. The compiled data is transmitted to the hardware accelerator.

In some implementations, one or more of the following can additionally be implemented either individually or in any feasible combination. The hardware accelerator can create buffers in response to the compiled data to temporarily store corresponding chunks being moved within memories of the hardware accelerator. A storage capacity of each buffer can depend on the reshape operation. The reshape solver can be programmed with a first set of one or more constraints. The constraint based solver can be programmed with a second set of one or more constraints. The transmitting to the reshape solver, the receiving from the reshape solver, the transmitting to the constraint based solver, and the receiving from the constraint based solver can be performed by a central processing unit (CPU) that implements a compiler. The compiling of the schedule and the transmitting to the hardware accelerator can be performed by the compiler.

Further, the received data can be updated to remove one or more chunks for which the source computing unit and the target computing unit are adjacently arranged within the hardware accelerator. The updating of the received data can be performed subsequent to the receiving from the reshape solver of the received data and prior to the transmitting to the constraint based solver of the received data. The schedule can be updated by removing cyclical routes or merging chunks moving over a single route to generate an updated schedule. The updating of the schedule can be performed subsequent to the receiving from the constraint based solver of the schedule and prior to the compiling of the schedule.

In another aspect, a system is described that can perform a reshape operation specified in a reshape layer of a neural network model. The reshape operation can reshape an input tensor to an output tensor. The system can include at least one programmable processor, and a machine-readable medium storing instructions that, when executed by the at least one processor, cause the at least one programmable processor to: transmit, to a reshape solver, the input tensor and the output tensor; receive, from the reshape solver, data identifying chunks of tensor data to be moved within memories of a hardware accelerator, a source computing unit on the hardware accelerator from where each corresponding chunk is to be moved, and a target computing unit on the hardware accelerator to where each corresponding chunk is to be moved; transmit, to a constraint based solver, the received data, a number of computing units within the hardware accelerator, and a maximum number of time steps over which the reshape operation is to be performed; receive, from the constraint based solver, a schedule based on the received data, the number of computing units within the hardware accelerator, and the maximum number of time steps; compile the schedule to generate compiled data; and transmit the compiled data to the hardware accelerator.

In some implementations, one or more of the following can additionally be implemented either individually or in any feasible combination. The hardware accelerator is configured to create buffers in response to the compiled data to temporarily store corresponding chunks being moved within memories of the hardware accelerator. A storage capacity of each buffer depends on the reshape operation. The reshape solver is programmed with a first set of one or more constraints. The constraint based solver is programmed with a second set of one or more constraints. The at least one programmable processor is a central processing unit (CPU) that implements a compiler. The compiling of the schedule and the transmitting to the hardware accelerator are performed by the compiler.

The at least one programmable processor is configured to update the received data to remove one or more chunks for which the source computing unit and the target computing unit are adjacently arranged within the hardware accelerator. The updating of the received data can be performed subsequent to the receiving from the reshape solver of the received data and prior to the transmitting to the constraint based solver of the received data.

The at least one programmable processor is configured to update the schedule by removing cyclical routes or merging chunks moving over a single route to generate an updated schedule. The updating of the schedule can be performed subsequent to the receiving from the constraint based solver of the schedule and prior to the compiling of the schedule.

In yet another aspect, a non-transitory computer program product is described that can store instructions that, when executed by at least one programmable processor, cause the at least one programmable processor to: transmit, to a reshape solver, the input tensor and the output tensor; receive, from the reshape solver, data identifying chunks of tensor data to be moved within memories of a hardware accelerator, a source computing unit on the hardware accelerator from where each corresponding chunk is to be moved, and a target computing unit on the hardware accelerator to where each corresponding chunk is to be moved; transmit, to a constraint based solver, the received data, a number of computing units within the hardware accelerator, and a maximum number of time steps over which the reshape operation is to be performed; receive, from the constraint based solver, a schedule based on the received data, the number of computing units within the hardware accelerator, and the maximum number of time steps; compile the schedule to generate compiled data; and transmit the compiled data to the hardware accelerator.

The at least one programmable processor is configured to update the received data to remove one or more chunks for which the source computing unit and the target computing unit are adjacently arranged within the hardware accelerator. The updating can be performed subsequent to the receiving from the reshape solver of the received data and prior to the transmitting to the constraint based solver of the received data.

The at least one programmable processor is configured to update the schedule by removing cyclical routes or merging chunks moving over a single route to generate an updated schedule. The updating of the schedule can be performed subsequent to the receiving from the constraint based solver of the schedule and prior to the compiling of the schedule.

The subject matter described herein provides many advantages. For example, the system described herein—including a central processing unit (CPU) that implements a compiler, a reshape solver, a constraint based solver, and a hardware accelerator—can enable, in response to a request for a reshape operation, optimal movement of tensor data within the hardware accelerator to efficiently use memory space within the hardware accelerator during the reshape operation. Further, the reshape solver can be programmed with one or more constraints, such as origin computing unit and destination computing unit for movement of a chunk of tensor data cannot be the same. Such constraint can advantageously prevent redundant movements of chunks within the same memory, thereby improving processing speed and avoiding latency. Furthermore, the CPU can perform preprocessing on the table of triplets to make the optimization problem of how to move different chunks of the tensor most efficiently without violating any of the constraints (which uses linear programming to render the optimal movement of tensor data within the hardware accelerator) smaller by removing from consideration movements between adjacent tiles, which in turn reduces the time in which the problem is solved, thereby reducing latency further.

In addition, the constraint based solver can be programmed with one or more constraints, such as an upper threshold limit for a number of chunks that can be transferred between memories of the hardware accelerator at any time-step. Solving a problem with fewer chunks but more time-steps can, at least in some implementations, be faster than solving a problem with more number of chunks but fewer time-steps. Moreover, the CPU can perform post-processing on the schedule by removing redundancies in the schedule by (a) removing cycles in routes of a single chunk, and/or (b) merging data to be transferred on any single route between any two different memories during any time step. Such removal of redundancy can advantageously further increase processing speed and reduce latency.

Additionally, the tensor data that has to be reshaped does not need to be stored in and collected from a single memory with dedicated space for reshape operations, and instead such tensor data is directly routed between the memories (e.g., tile memories) of the hardware accelerator in an optimal manner, thereby preventing the need for such single memory. This is advantageous, as such single memory may either render unutilized memory space in that memory or may limit the type of neural network models that can be run on the hardware accelerator. Such direct movement of tensor data between memories of a hardware accelerator can, thus, not only save memory space, but also allow any number and type of neural network models—that require reshaping of tensors, regardless of the sizes of those tensors—to be run on the hardware accelerator.

Furthermore, the hardware accelerator further includes a cache that can store compiled data for frequently recurring reshape operations (i.e. reshape operations recurring more than a threshold number of times per preset time period). Such storage allows the hardware accelerator to retrieve the already calculated and stored compiled data (which is the solution to the optimization problem noted above) from the cache rather than re-perform all the steps described herein for generating the compiled data, thereby substantially increasing processing speed and reducing latency.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

FIG. 3 illustrates one example of a table of triplets—chunks of tensor data to be moved, source computing unit (on the hardware accelerator) from which each chunk needs to be moved, and destination computing unit (on the hardware accelerator) to which the chunk needs to be moved—generated by the reshape solver in response to receipt, from the compiler, of an input tensor (that needs to be reshaped) and an output tensor (to which the input tensor is to be reshaped).

FIG. 5 illustrates one example of the updated table generated by the process of FIG. 4 when implemented on the table of FIG. 3.

FIG. 7 illustrates one example of the schedule generated by the process of FIG. 6.

Like reference symbols in the various drawings indicate like elements.

DETAILED DESCRIPTION

Figure 1:
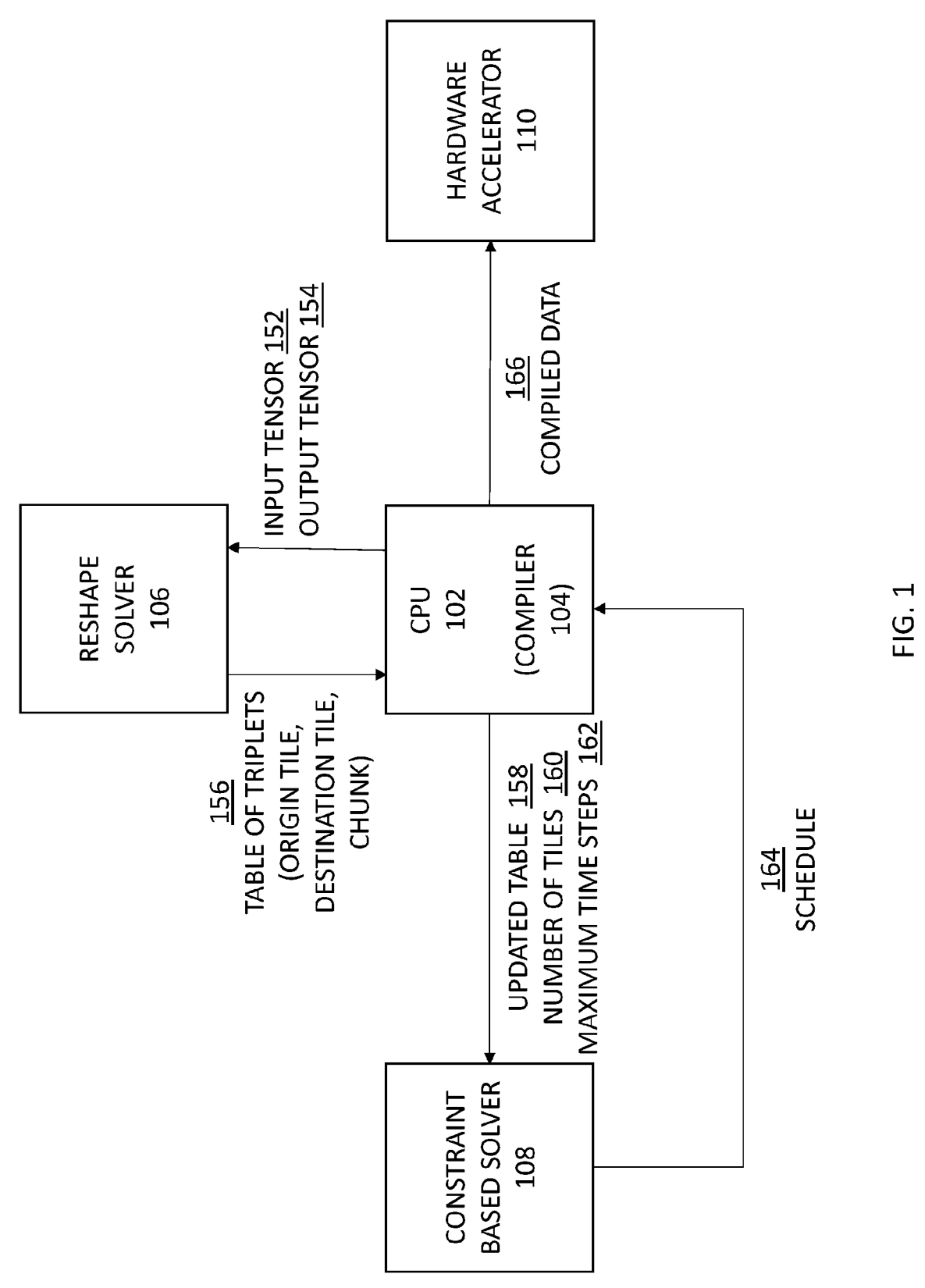
FIG. 1 illustrates an example of a system—including a central processing unit (CPU) that implements a compiler, a reshape solver, a constraint based solver, and a hardware accelerator—that enables, in response to a request for a reshape operation, optimal movement of tensor data within the hardware accelerator to optimize memory usage within the hardware accelerator during the reshape operation.

FIG. 1 illustrates an example of a system 100—including a central processing unit (CPU) 102 that implements a compiler 104, a reshape solver 106, a constraint based solver 108, and a hardware accelerator 110—that enables, in response to a request for a reshape operation, efficient movement of tensor data within the hardware accelerator 110 to improve memory usage within the hardware accelerator 110 during the reshape operation. The system 100 can be a computing device. Such computing device can be a mobile device, such as a phone, a phablet computer, a tablet computer, a laptop, and/or any other mobile device. While the computing device is described as a mobile device, in some implementations, the computing device can be a desktop computer or a cluster or network of computers.

The compiler 104 can be a software program that can convert instructions—such as instructions to move data between memories of the hardware accelerator 110—into a machine-code or lower-level form so that they can be read and executed by hardware accelerator 110. While the compiler 104 is shown as being configured to execute on the CPU 102, in some implementations the compiler 104 may be configured to execute on any other processor or special-purpose electronic chip with a special-purpose hardware circuit. While some implementations discussed herein describe operations performed by the CPU 102, in other implementations where the compiler 104 is being executed on another processor or electronic chip, these operations can be performed by that processor or electronic chip.

The hardware accelerator 110 can be computer hardware that is specially made to perform some functions more efficiently than possible in software running on a general-purpose processor. For example, the hardware accelerator 110 can execute deep feed-forward neural networks such as convolutional neural networks (CNNs). The hardware accelerator 110 can be a tensor processing unit (TPU). Although a TPU is described, in other implementations, the hardware accelerator 110 can be any other hardware accelerator 110, such as a graphics processing unit (GPU), digital signal processor (DSP), field-programmable analog array (FPAA), sound card, network processor, cryptographic accelerator, artificial intelligence accelerator, physics processing unit (PPU), data compression accelerator, network on a chip, field programmable gate arrays (FPGA), application specific integrated circuit (ASIC), complex programmable logic device, and/or a system on chip. The hardware accelerator 110 can have several computing units, each of which can have corresponding one or more memories, as further explained below by FIG. 12.

Figure 12:
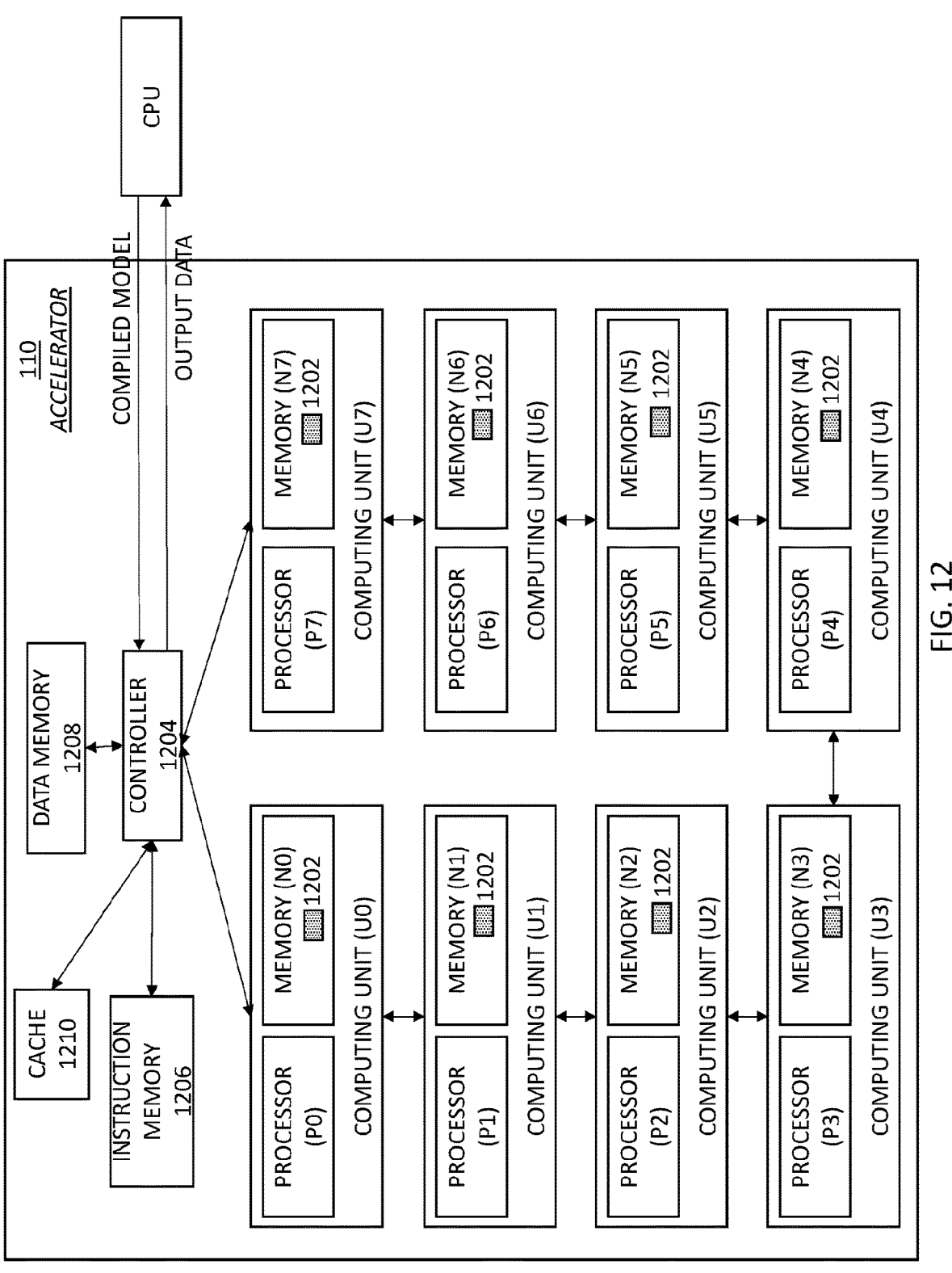
FIG. 12 illustrates architecture of the hardware accelerator, showing memory buffers formed within the memories of the hardware accelerator to store data transferred to corresponding memories based on the compiled data that indicates the updated schedule.

The reshape solver 106 can be one or more computer programs—implemented by one or more computers—that determine, for a reshape operation, chunks of tensor data in which the entire tensor data is to be moved, and efficient (e.g. optimal) routes for movement of those chunks, wherein each route indicates a corresponding origin computing unit and destination computing unit of the hardware accelerator 110 (see FIG. 12, which shows various computing units of the hardware accelerator 110). The term tensor as used herein refers to a multi-dimensional geometric object, which can be a matrix or a data array. The constraint based solver 108 can be one or more computer programs—implemented by one or more computers—that determine schedule in which the chunks are to be moved between memories of the hardware accelerator 110.

The compiler 104 can receive a request for a reshape operation (to be performed by a reshape layer of a neural network model) from an application (e.g. camera application) being executed on the system 100. Such request can be part of instructions to the compiler to compile the neural network model. In response to such request, the compiler 104 can compute an effective (e.g. optimal) schedule for movement of tensor data within the hardware accelerator 110 so as to optimize memory usage within the hardware accelerator 110 during the reshape operation. To do so, the compiler 104 can first transmit, to the reshape solver 106, an input tensor 152 (that needs to be reshaped via a reshape operation) and an output tensor 154 (to which the input tensor 152 is to be reshaped via the reshape operation). In some implementations, the input tensor 152 can be referred to as a current tensor, and the output tensor 154 can be referred to as a desired tensor.

The reshape solver 106 can receive, from a processor (e.g. the CPU 102) or any electronic chip, the input tensor 152 and the output tensor 154. The reshape solver 106 can be programmed with one or more constraints, such as origin computing unit (from which chunk of tensor data is moved) and destination computing unit (to which the chunk is moved) cannot be the same, which can advantageously prevent redundant movements of chunks within the same memory, thereby improving processing speed and avoiding latency. The reshape solver 106 can determine, based on the input tensor 152 and the output tensor 154 and the one or more constraints, chunks of tensor data to be transferred, source/origin computing unit from which each chunk is to be transferred, and a target computing unit to which that chunk is to be transferred.

The reshape solver 106 determines chunks of tensor data to be transferred based on the input tensor 152 and the output tensor 154 as per the following. The reshape solver 106 uses a formulation of linear programming problems such as multi-commodity data flow problems. The reshape solver 106 creates a linear programming problem instance by setting up a sequence of constraints on how the data may be moved between accelerator computing units (i.e. tiles), for example, by constraining the amount of data that may be moved at a time between tiles. The reshape solver 106 adds constraints that limit the amount of transitional data (i.e. data that transitions or moves between accelerator computing units) that may exist on a single tile at any given time step. This puts a bound on the amount of memory that may be used for communication on each tile. Then the reshape solver 106 sets up an objective to minimize the number of time steps over which the transfer occurs subject to the constraints. This linear programming problem is then passed on to the constraint based solver 108 to obtain a solution that indicates the chunks of tensor data to be transferred. Also, the reshape solver provides an upper bound on the number of time steps for the linear programming problem. To provide such upper bound, the reshape solver 106 starts with a small (e.g. preset) upper bound and attempts to solve the problem. If that small upper bound does not generate the solution, the reshape solver 106 increases the bound to a larger value (i.e. larger than the preset by a particular amount). The reshape solver 106 does this repeatedly until it finds a solution (or runs out of time allocated for determining a solution).

Using this determination of chunks of tensor data to be transferred, the reshape solver 106 can generate a table 156 having values of three variables—chunk, origin computing unit, and destination computing unit—that are also referred to as triplets. The reshape solver 106 can transmit the table 156 to the CPU 102.

The processor (e.g. CPU 102) or electronic chip can receive the table from the reshape solver 106. The processor (e.g. CPU 102) or electronic chip can perform pre-processing on the table 156 to generate an updated table 158 of triplets. The pre-processing can remove, from the table 156, chunks with movements between adjacent computing units (e.g., movement from a source computing unit to a destination computing unit that is adjacent to the source computing unit). The processor (e.g. CPU 102) or electronic chip can separately instruct the hardware accelerator 110 to perform the movements corresponding to the removed chunks. Such removal of data can optimize the movements limited to those between distant computing units, thereby dedicating processing resources for the computationally intensive movements without expending resources on computationally inexpensive movements, which in turn can increase overall processing speed and decrease latency. The processor (e.g. CPU 102) or electronic chip can transmit, to the constraint based solver 108, (a) the updated table 158 along with (b) the number of computing units 160 in the hardware accelerator 110, and (c) maximum number (which can be varied at time of manufacture) of time steps within which the transfer of the entire tensor data needs to be transferred to perform the reshape operation.

The constraint based solver 108 can receive, from the processor (e.g. CPU 102) or electronic chip, (a) the updated table 158, (b) values for number of computing units 160 in the hardware accelerator 110, and (c) maximum number of time steps within which the transfer of the entire tensor data needs to be transferred to perform the reshape operation. The constraint based solver 108 can be programmed with one or more constraints (e.g. upper threshold limit for a number of chunks that can be transferred between memories of the hardware accelerator 110 at any time-step). Solving a problem with fewer chunks but more time-steps can, at least in some instances, be faster than solving a problem with more number of chunks but fewer time-steps. Based on the updated table 158, values for number of computing units 160 in the hardware accelerator 110, maximum number of time steps, and the constraints, the constraint based solver 108 can generate a schedule 164 indicating routes for transfer of chunks of tensor data between computing unit memories of the hardware accelerator 110 at various time steps. The constraint based solver 108 generates the schedule (also referred herein as a solution to the linear programming problem) by solving the linear programming problem provided by the reshape solver 106. This schedule (or solution) includes the time steps at which each chunk needs to be communicated at each tile of the accelerator. The constraint based solver 108 can transmit the schedule 164 to the processor (e.g. CPU 102) or electronic chip.

The processor (e.g. CPU 102) or electronic chip can receive the schedule 164. The compiler 104 can perform post-processing on the schedule 164 by removing redundancies in the schedule 164 to generate an updated schedule. The processor (CPU 102) or electronic chip can remove redundancies by (a) removing cycles in routes of a single chunk, and/or (b) merging data to be transferred on any single route between any two different memories during any time step. Such removal of redundancy can advantageously increase processing speed, and reduce latency. Removal of such redundancies from the schedule 164 can render a modified schedule. The compiler 104 can compile data including the modified schedule to generate compiled data 166. The compiled data 166 can include (a) instructions to (i) move chunks according to modified schedule and (ii) create narrow memory buffers based on chunks, and (b) input data for the neural network. The compiler 104 can transmit the compiled data 166, as part of the compiled data structure for the corresponding model, to the hardware accelerator 110.

The hardware accelerator 110 can receive the compiled data 166 from the compiler 104. The hardware accelerator 110 can use the compiled data 166 to move the chunks in accordance with the modified schedule, and can create temporary memory buffers 1202 to store chunks that are being moved around in various memories of the hardware accelerator 110.

In the implementations discussed above, the tensor data that has to be reshaped does not need to be first collected from the memories N0-N7 of the hardware accelerator in a single dedicated memory (not shown) and then sent out to those memories N0-N7 from that single memory in accordance with reshape requirements. Instead, such tensor data is directly routed between those memories N0-N7 in an efficient manner according to the reshape requirements. This architecture without such single memory can thus, advantageously, not only optimize usage of memory space, but also allow any number and type of neural network models to be run on the hardware accelerator 110.

Figure 2:
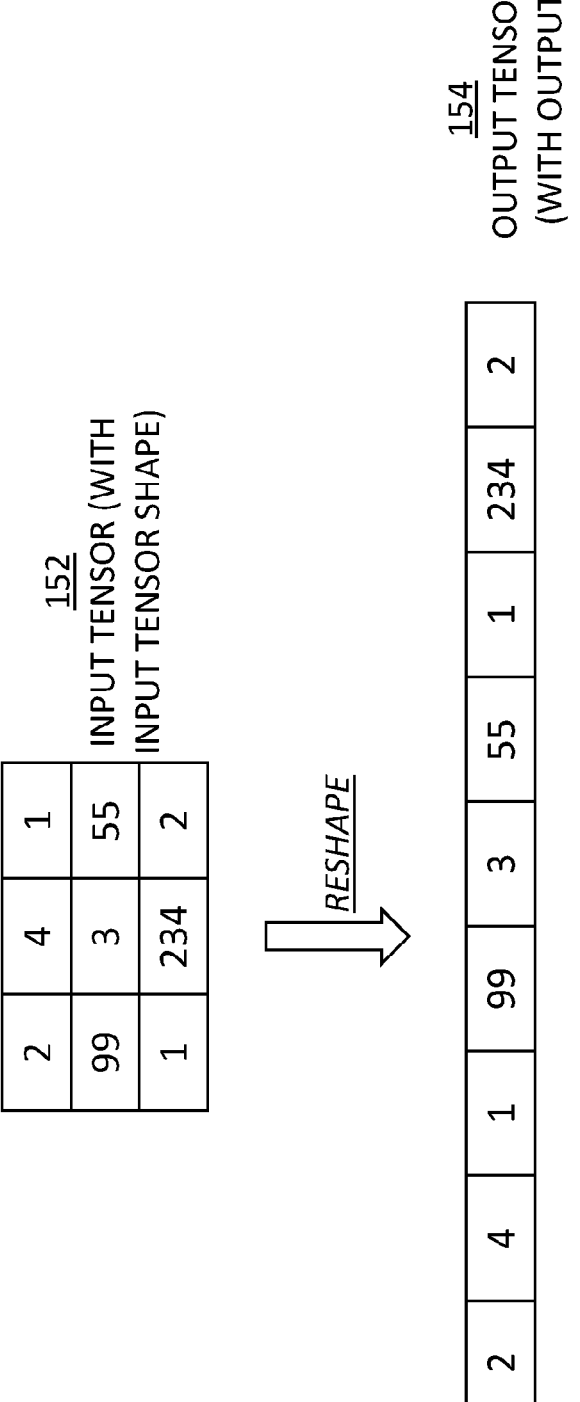
FIG. 2 illustrates one example of the reshape operation.

FIG. 2 illustrates one example of the reshape operation performed by a reshape layer of a neural network. The reshape layer varies the layout in which elements of a tensor are presented. More particularly, the reshape operation transforms the input tensor 152 with a first input tensor shape into an output tensor 152 with an output tensor shape. In the simple example shown, the reshape layer can reshape 9 elements arranged in 3×3 matrix 152 into the same 9 elements arranged in a 1×9 matrix (which is a flatter or longer matrix). Modifying the 3×3 matrix 152 into the 1×9 matrix 154 is one example of the reshape operation.

Although the input tensor 152 (with the input tensor shape) and the output tensor 154 (with the output tensor shape) are each shown as a two dimensional matrix, in some implementations each of the input tensor 152 or the output tensor 154 (and thus the input tensor shape corresponding to the input tensor 152 and the output tensor shape of the output tensor) can have any number of dimensions, such as 3 dimensions, 4 dimensions, 5 dimensions, and so on, and each dimension can have any number of elements.

FIG. 3 illustrates one example of a table 156 of triplets generated by the reshape solver 106 in response to receipt, from the processor (e.g. CPU 102) or electronic chip, of the input tensor 152 and the output tensor 154. The triplets include chunks 302 of tensor data to be moved, source computing unit memory 304 from which each chunk needs to be moved, and destination computing unit memory 306 to which the chunk needs to be moved. The reshape solver 106 determines the chunks 302 of tensor data to be moved, source computing unit memory 304 from which each chunk needs to be moved, and destination computing unit memory 306 to which the chunk needs to be moved, and, using this determination, generates the table 156. The source computing unit memory and the destination computing unit memory are memories within the hardware accelerator 110, as described by FIG. 12.

The reshape solver 106 can be programmed with one or more constraints, such as origin computing unit and destination computing unit for movement of a chunk of tensor data cannot be the same. Accordingly, the table 156 generated by the reshape solver 106 does not have redundant triplets where the origin computing unit memory 304 is same as the destination computing unit memory 306. Avoidance of such redundant triplets advantageously enhances processing speed and avoids latency.

Figure 4:
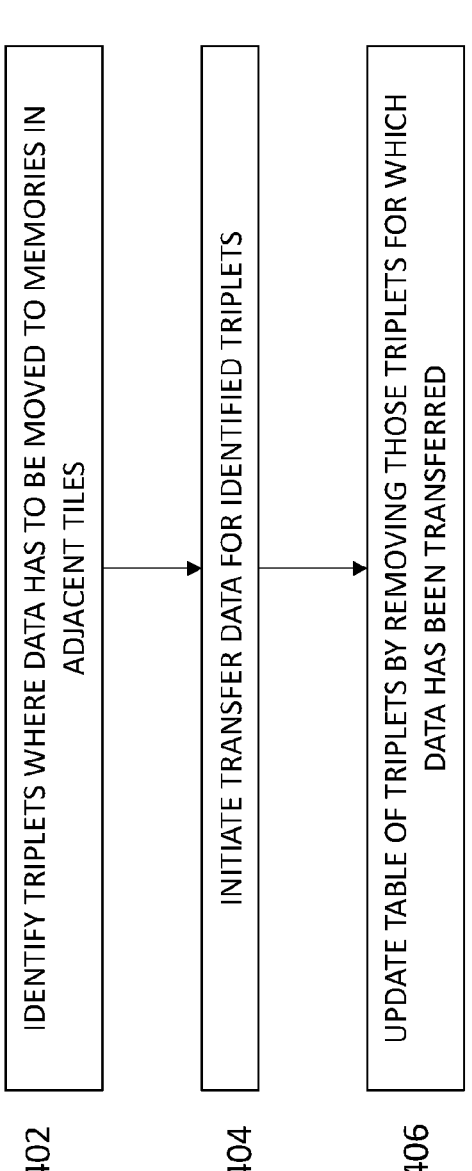
FIG. 4 illustrates pre-processing by the CPU to generate an updated table of triplets that is provided to the constraint based solver.

FIG. 4 illustrates pre-processing by the processor (e.g. CPU 102) or electronic chip to generate an updated table 158 of triplets that is provided to the constraint based solver 108. While some implementations discussed herein describe operations performed by the CPU 102, in other implementations where the compiler 104 is being executed on another processor or electronic chip, these operations can be performed by that processor or electronic chip. The CPU 102 can perform pre-processing on the table 156 to generate the updated table 158. The CPU 102 can identify, at 402, triplets within the table 156 where chunks 302 of tensor data have to be moved to memories in adjacent computing units. For example, in table 156, chunk C4 is moved from N2 to adjacent memory N3 (e.g., see architecture of the accelerator 110 in FIG. 12). The CPU 102 can initiate, at 404, a transfer of such identified chunks (e.g., chunk C4 in table 156). The CPU 102 can then update the table 156 by removing those triplets for which data has been transferred (e.g., triplet corresponding to chunk C4 in table 156) to generate the updated 158.

The pre-processing at 402, 404 and 406 can advantageously lower the number of chunks that are left to be moved within various memories of the hardware accelerator, which can in many instances (e.g. when the number of chunks is large) increase processing speed and thus lower latency.

FIG. 5 illustrates one example of the updated table 158 generated by the pre-processing of FIG. 4 when implemented on the table 156. Note the updated table 158 does not include the triplet corresponding to the chunk C4 in the table 156, as such chunk has already been moved.

The CPU 102 can transmit, to the constraint based solver 108, (a) the updated table 158 along with (b) a number of computing units 160 in the hardware accelerator 110, and (c) maximum number (which can be varied at time of manufacture) of time steps within which the transfer of the entire tensor data needs to be transferred to perform the reshape operation.

Figure 6:
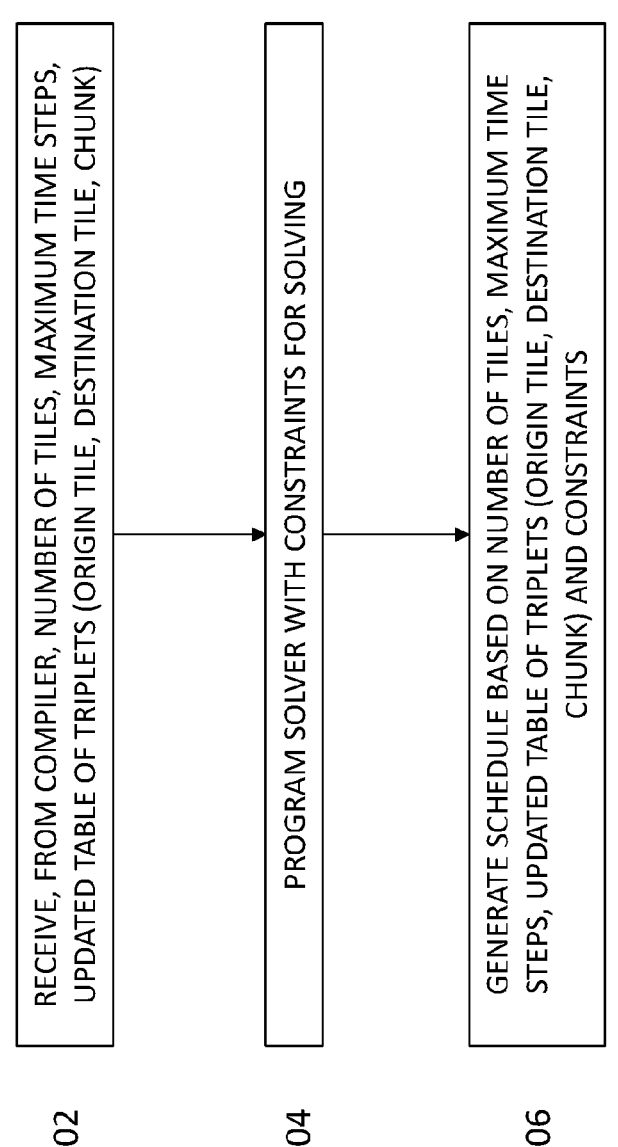
FIG. 6 illustrates a process implemented by the constraint based solver to generate-based on a number of computing units within the hardware accelerator, maximum number (which can be varied at time of manufacture) of time steps within which the data transfer needs to be performed, the updated table of FIG. 5, and constraints for the constraint based solver—a schedule of transfer of chunks of tensor data between computing unit memories of the accelerator.

FIG. 6 illustrates a process implemented by the constraint based solver 108 to generate a schedule 164 of transfer of chunks of tensor data between computing unit memories of the hardware accelerator 110. The constraint based solver 108 can receive, at 602 from the CPU 102, the updated table 158, number of computing units 160, and maximum time steps 162. The constraint based solver 108 can be programmed, at 604, with one or more constraints, such as an upper threshold limit for a number of chunks that can be transferred between memories of the hardware accelerator 110 at any time-step. Solving a problem with fewer chunks but more time-steps can, at least in some instances, be faster than solving a problem with more number of chunks but fewer time-steps.

The constraint based solver 108 can generate, at 606, the schedule 164 based on the number of computing units within the hardware accelerator 110, maximum number (which can be varied at time of manufacture) of time steps within which the data transfer needs to be performed, the updated table 158, and constraints for the constraint based solver 108.

Figure 7:
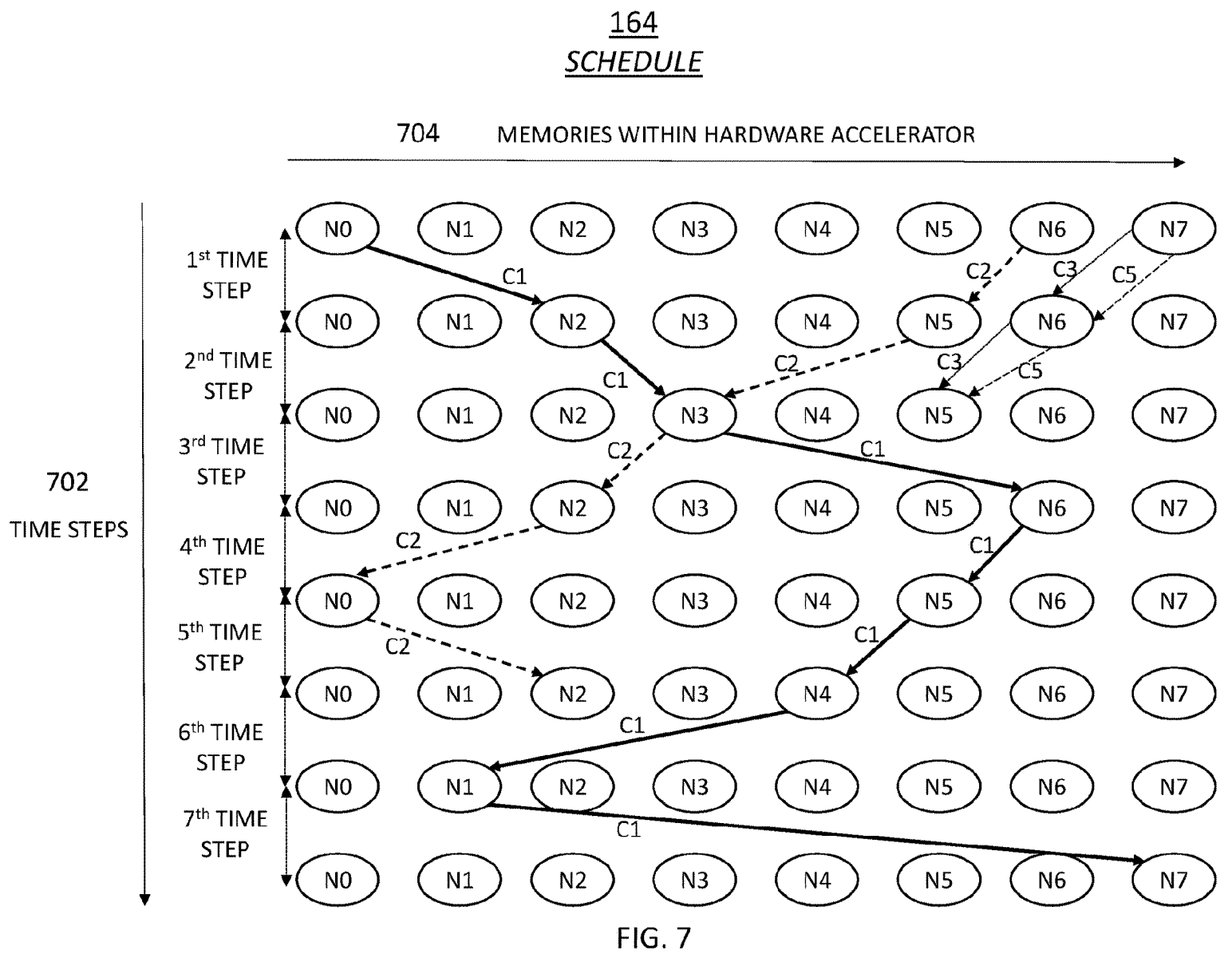

FIG. 7 illustrates one example of the schedule 164 generated by the process of FIG. 6. The schedule 164 shows various time-steps 702 of movement of chunks C1, C2, C3 and C5 within the updated table 158 between memories N0-N7 of the hardware accelerator 110. The maximum number of time-steps 702 with which the constraint based solver 108 is programmed is 7 in the shown example, and this value can be varied at the time of manufacture of the system 100.

For example, per the schedule 164, the chunk C1 moves from memory N0 to memory N2 in the first time step, memory N2 to memory N3 in the second time step, memory N3 to memory N6 in the third time step, memory N6 to memory N5 in the fourth time step, memory N5 to memory N4 in the fifth time step, memory N4 to memory N1 in the sixth time step, and memory N1 to memory N7 in the seventh time step. Similarly, the paths for chunks C2, C3 and C5 are shown. Other chunks in the updated table 158 are not shown for simplicity.

Further, the movement for some chunks (e.g., C2, C3 and C5) may not need all of the seven time steps 702, as shown. In other implementations, the constraint based solver 108 can be programmed with a constraint that movement of every chunk requires all time steps, and in such implementations the movement of all chunks may need all of the time steps 702 (e.g., all of the 7 time-steps in the shown implementation).

Figure 8:
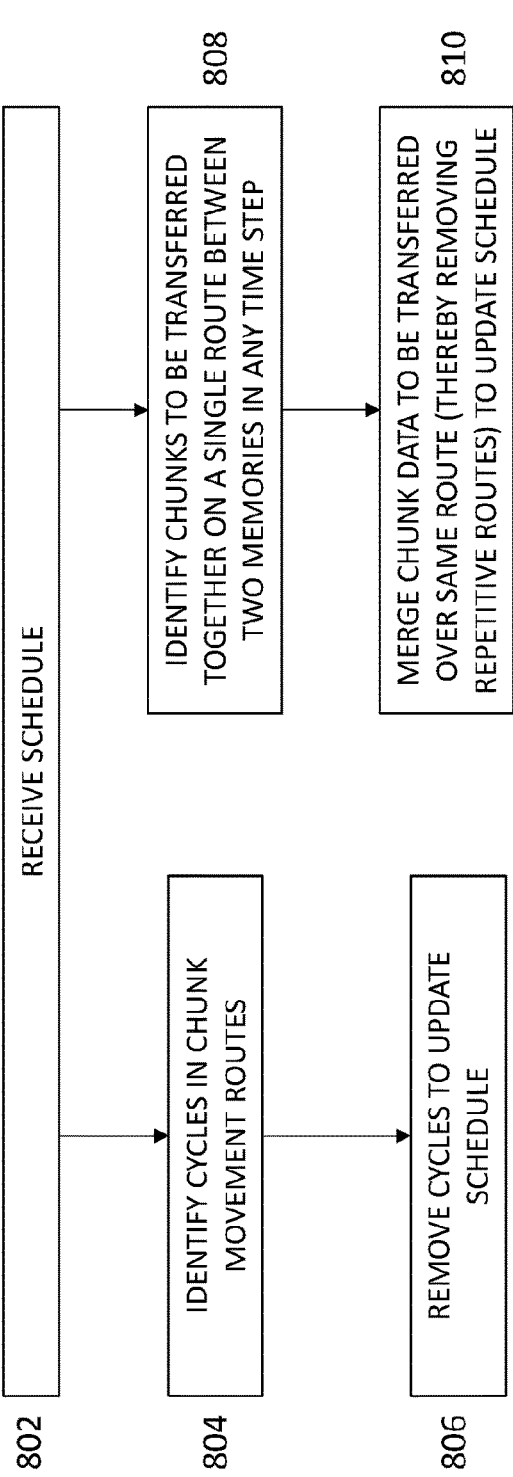
FIG. 8 illustrates a process of post-processing, by the compiler, of the schedule by removing redundancies in the schedule to generate an updated schedule.

FIG. 8 illustrates a process of post-processing, by the CPU 102, of the schedule 164 by removing redundancies in the schedule to generate an updated schedule. The CPU 102 can receive, at 802, the schedule 164 from the constraint based solver 108. The CPU 102 can identify, at 804, cycles in chunk movement routes, one example of which is described below by FIG. 9. The CPU 102 can remove, at 806, the cycles to update the schedule. The CPU 102 can identify, at 808, chunks to be transferred together on a single route between two memories in any time step, one example of which is described below by FIG. 9. The CPU 102 can merge, at 810, chunk data to be transferred over a same route between two corresponding memories at any time step to update the schedule. The final updated schedule, attained after 806 and 810, is described below by FIG. 10.

Figure 9:
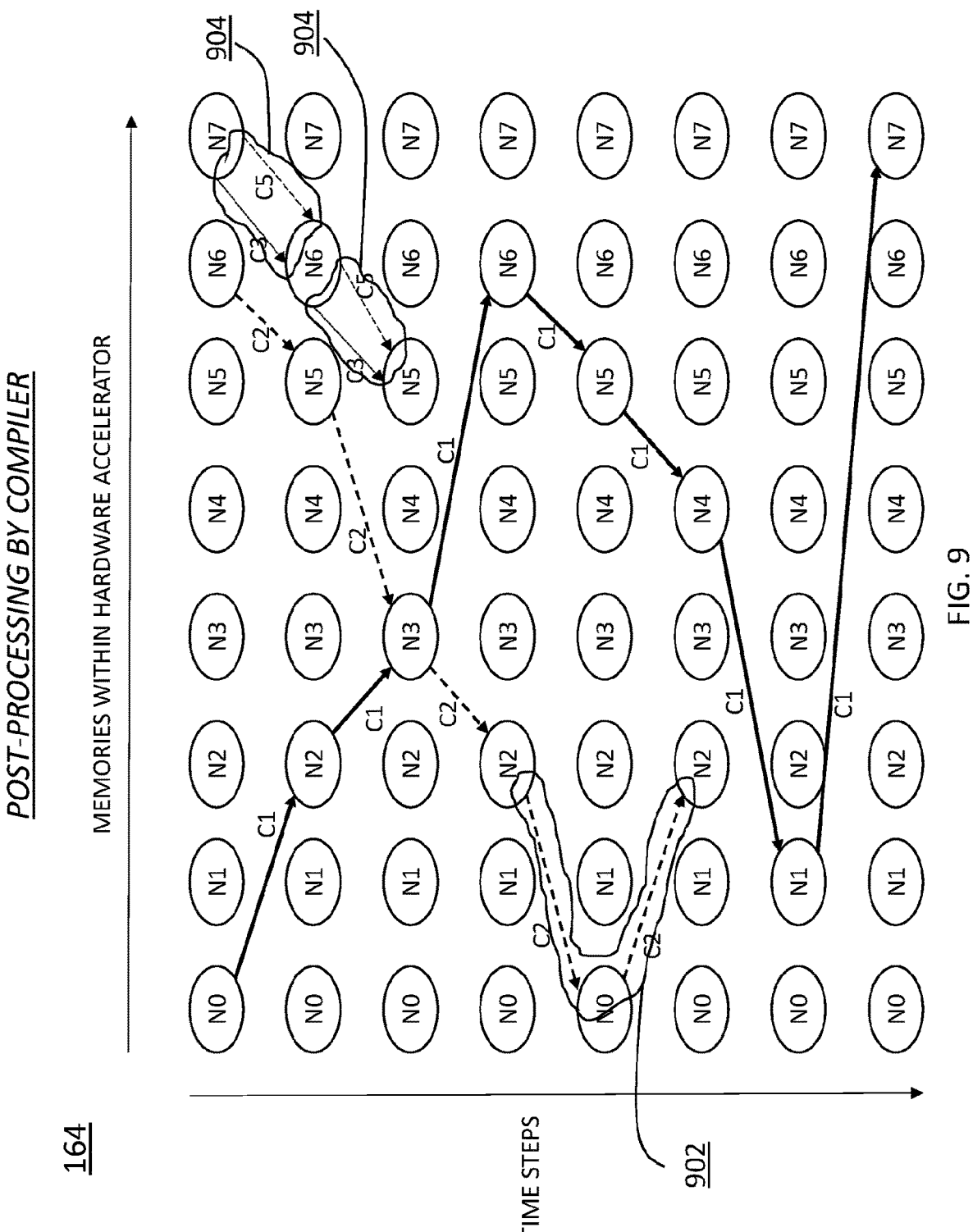
FIG. 9 illustrates the schedule of FIG. 7 on which post-processing is being performed by the compiler.

FIG. 9 illustrates the schedule of FIG. 7 on which post-processing is being performed by the compiler 104. The CPU 102 can receive the schedule 164 from the constraint based solver 108. The CPU 102 can identify cycles 902 in chunk movement routes. A cycle 902 is formed when the chunk starts at one memory at any time-step 702, and then ends up in the same memory at the last time-step 702 for that chunk. For example, the chunk C2 starts at memory N2 in the beginning of the fourth time-step 702, and ends up at the same memory N2 at the end of the fifth time-step 702. The CPU 102 can remove, at 806, such cycles to update the schedule, as shown in the updated schedule in FIG. 10, which is described below. The updated schedule thus has a lower redundancy.

The CPU 102 can identify, at 808, chunks to be transferred together on a single route 904 between two memories in any time step. For example, the chunks C3 and C5 move on the same route 904 in the first time step, and another same route 904 in the second time step. The CPU 102 can merge chunk data to be transferred over such same routes 904 between two corresponding memories at any time step to update the schedule, as shown in the updated schedule of FIG. 10. The updated schedule has a lower redundancy for this additional reason.

The final updated schedule, attained after 806 and 810, is described below by FIG. 10. Because the updated schedule has a lower redundancy, it has a faster processing speed, which lowers latency.

Figure 10:
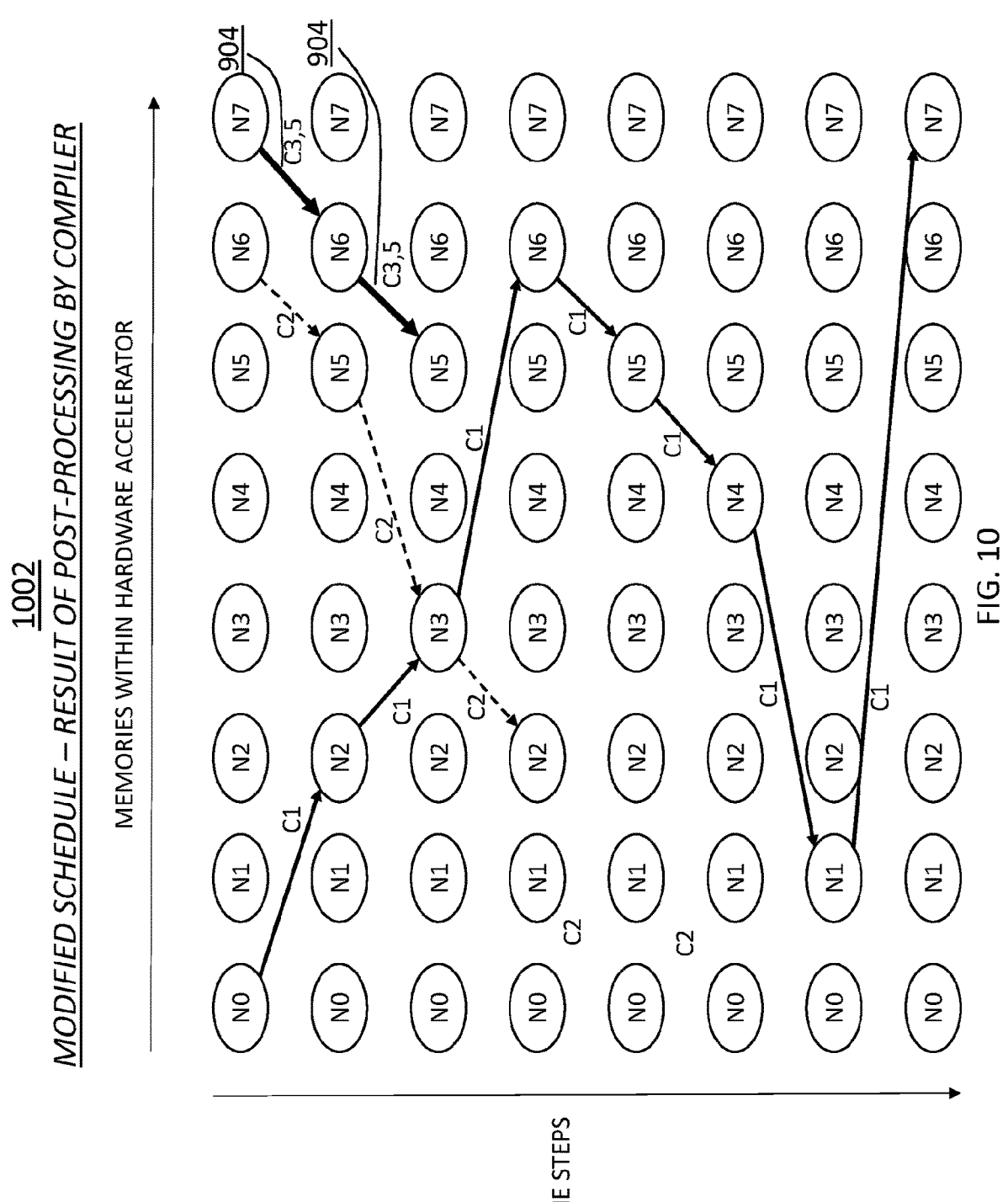
FIG. 10 illustrates the updated schedule obtained by the post-processing of FIGS. 8 and 9.

FIG. 10 illustrates the updated schedule 1002 generated by the post-processing of FIGS. 8 and 9. Note the updated schedule 1002 does not include the redundant chunk routes within the cycle 902, and merges the data for chunks C3 and C4 that is moved over the routes 904. Because the updated schedule 1002 has a lower redundancy than the schedule 164, the updated schedule 1002 has a faster processing speed, which lowers latency of the system 100.

Figure 11:
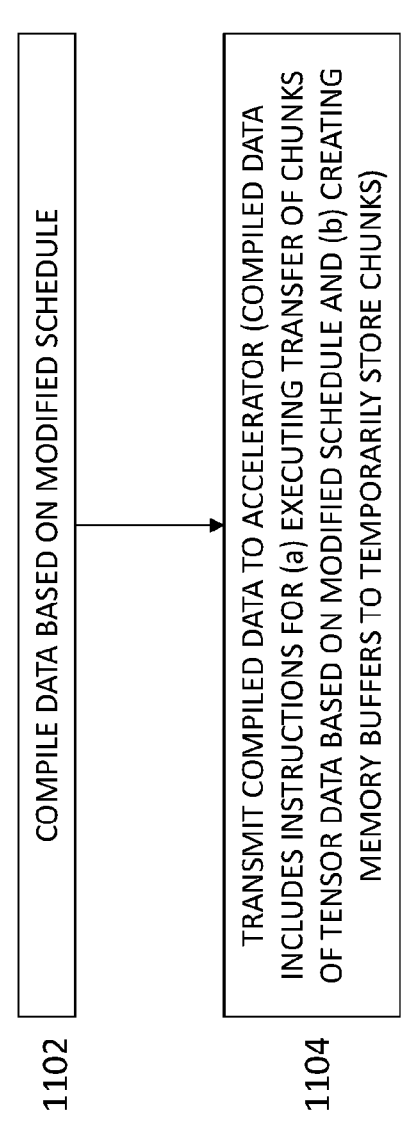
FIG. 11 illustrates a process by the compiler to compile data based on the updated schedule of FIG. 10, and transmission of the compiled data to the accelerator, which executes data transfers within the memories based on the compiled data formed using the updated schedule.

FIG. 11 illustrates a process performed by the compiler 104. The compiler 104 can compile, at 1102, chunk data based on the updated schedule 1002 to generate compiled data 166. The compiled data can include instructions for (a) executing transfer of chunks of tensor data based on modified schedule 1002 and (b) creating narrow memory buffers within each computing unit to temporarily store chunks. The compiler 104 can transmit, at 1104, the compiled data 166 to the hardware accelerator 110, which can executes transfers of chunk data within the memories of the hardware accelerator 110 in accordance with the updated schedule 1002.

FIG. 12 illustrates architecture of the hardware accelerator 110, showing memory buffers 1202 formed within the memories N0-N7 of the hardware accelerator 110 to store data transferred to corresponding memories based on the compiled data 166. The hardware accelerator 110 can include computing units U0-U7 that can create the narrow memory buffers 1202 within each computing unit to temporarily store chunks.

The hardware accelerator 110 is configured to perform neural network computations in response to instructions and input data specified in the compiled model 166. The hardware accelerator 110 can have a controller 1204 and multiple separate computing units U0-U7. While eight computing units U0-U7 are shown, in alternate implementations the hardware accelerator 110 can have any other number of computing units, such as any number between two and sixteen. Each of the computing units U0-U7 can have at least one corresponding programmable processor (amongst processors P0-P7) and at least one corresponding memory (amongst memories N0-N7). In some implementations, the parameters for processing neural network models, as indicated by the compiled data 166, may be distributed across one or more (e.g., all) of the memories N0-N7.

The hardware accelerator 110 can perform various neural network computations to process the neural network model based on the compiled data structure 166 generated by the compiler 104. To store the data received from the compiler 104, the hardware accelerator 110 further includes an instruction memory 1206 to store instructions and a data memory 1208 to store input data for the neural network.

The computing units U0-U7 can accelerate machine learning inference workloads of a neural network layer. Each of the computing units U0-U7 is self-contained and can independently execute computations required by a given layer of a multi-layer neural network. The hardware accelerator 110 can perform the computation of a neural network layer by distributing tensor computations across the computing units U0-U7. The computation process can involve performing a reshape operation. The architecture of the hardware accelerator 110, and more specifically the creation of the memory buffers 1202 to temporarily store chunks, can prevent the need for the hardware accelerator 110 to store all the chunks in a single large-spaced memory after each time step, and instead such tensor data is directly routed between the memories of the hardware accelerator in an efficient manner. This architecture, thus, prevents the need to have, on the hardware accelerator 110, a single memory that may not only need a large space but also limit the kind of machine learning models that can be run on the hardware accelerator 110 as spare capacity in that memory is needed just to perform the reshape operation. The implementations discussed herein can thus, advantageously, not only save memory space, but also allow any number and type of machine learning models to be run on the hardware accelerator 110.

The hardware accelerator 110 can further include a cache 1210 that can store compiled data 166 for frequently recurring reshape operations (i.e. reshape operations recurring more than a threshold number of times per preset time period). The controller 1204 can determine whether a current reshape operation is a frequently recurring reshape operation, and if it is the controller 1204 can retrieve the already calculated and stored compiled data 166 from the cache 1210 rather than re-perform all the steps described above for generating the compiled data 166, thereby increasing processing speed and reducing latency in the system 100.

Further, the computation process performed within a neural network layer may include a multiplication of an input tensor including input activations with a parameter tensor including weights. The computation can include multiplying an input activation with a weight on one or more cycles and performing an accumulation of products over many cycles (note the term cycle used here is different from the cycle 902 described above).

Each of the computing units U0-U7 can implement a software algorithm to perform tensor computations by processing a nested loop to traverse an N-dimensional tensor (where N can be any integer). In one example computational process, each loop can be responsible for traversing a particular dimension of the N-dimensional tensor. For a given tensor construct, a computing unit (of the computing units U0-U7) can require access to an element of a particular tensor to execute a plurality of dot product computations associated with the tensor. Computation occurs when an input activation is multiplied with a parameter or weight. Tensor computations end when multiplication results are written to an output bus, which serially connects the computing units and over which data is passed between the computing units, and stored in memory.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of performing a reshape operation specified in a reshape layer of a neural network model, the method comprising:

transmitting, to a reshape solver, an input tensor with an input tensor shape and an output tensor with an output tensor shape;

receiving, from the reshape solver, data identifying chunks of tensor data to be moved within memories of a hardware accelerator, a source computing unit on the hardware accelerator from where each corresponding chunk is to be moved, and a target computing unit on the hardware accelerator to where each corresponding chunk is to be moved;

transmitting, to a constraint based solver, the received data and a maximum number of time steps over which the reshape operation is to be performed;

receiving, from the constraint based solver, a schedule based on the received data, a number of computing units within the hardware accelerator, and a maximum number of time steps, the schedule indicating routes for transferring the chunks of tensor data between the memories of the hardware accelerator;

updating the schedule by removing cyclical routes or merging chunks moving over a single route or both to generate an updated schedule;

compiling the updated schedule to generate compiled data; and transmitting the compiled data to the hardware accelerator.

2. The method of claim 1, further comprising:

creating, by the hardware accelerator, buffers in response to the compiled data to temporarily store corresponding chunks being moved within memories of the hardware accelerator.

3. The method of claim 1, wherein the reshape solver is programmed with a first set of one or more constraints.

4. The method of claim 1, wherein:

the transmitting to the reshape solver, the receiving from the reshape solver, the transmitting to the constraint based solver, and the receiving from the constraint based solver are performed by a central processing unit (CPU) that implements a compiler; and the compiling of the schedule and the transmitting to the hardware accelerator are performed by the compiler.

5. The method of claim 1, further comprising:

updating the received data to remove one or more chunks for which the source computing unit and the target computing unit are adjacently arranged within the hardware accelerator, the updating being performed subsequent to the receiving from the reshape solver of the received data and prior to the transmitting to the constraint based solver of the received data.

6. The method of claim 2, wherein a storage capacity of each buffer depends on the reshape operation.

7. The method of claim 3, wherein the constraint based solver is programmed with a second set of one or more constraints.

8. A system that performs a reshape operation specified in a reshape layer of a neural network model, the reshape operation configured to reshape an input tensor with an input tensor shape to an output tensor with an output tensor shape, the system comprising:

at least one programmable processor; and a machine-readable medium storing instructions that, when executed by the at least one programmable processor, cause the at least one programmable processor to:

transmit, to a reshape solver, the input tensor and the output tensor;

receive, from the reshape solver, data identifying chunks of tensor data to be moved within memories of a hardware accelerator, a source computing unit on the hardware accelerator from where each corresponding chunk is to be moved, and a target computing unit on the hardware accelerator to where each corresponding chunk is to be moved;

transmit, to a constraint based solver, the received data, a number of computing units within the hardware accelerator, and a maximum number of time steps over which the reshape operation is to be performed;

receive, from the constraint based solver, a schedule based on the received data, the number of computing units within the hardware accelerator, and the maximum number of time steps, the schedule indicating routes for transferring the chunks of tensor data between the memories of the hardware accelerator;

updating the schedule by removing cyclical routes or merging chunks moving over a single route or both to generate an updated schedule;

compile the updated schedule to generate compiled data; and transmit the compiled data to the hardware accelerator.

9. The system of claim 8, wherein the hardware accelerator is configured to create buffers in response to the compiled data to temporarily store corresponding chunks being moved within memories of the hardware accelerator.

10. The system of claim 8, wherein the reshape solver is programmed with a first set of one or more constraints.

11. The system of claim 8, wherein:

the at least one programmable processor is a central processing unit (CPU) that implements a compiler; and the compiling of the schedule and the transmitting of the compiled data to the hardware accelerator are performed by the compiler.

12. The system of claim 8, wherein the at least one programmable processor is configured to update the received data to remove one or more chunks for which the source computing unit and the target computing unit are adjacently arranged within the hardware accelerator, the updating being performed subsequent to the receiving from the reshape solver of the received data and prior to the transmitting to the constraint based solver of the received data.

13. The system of claim 9, wherein a storage capacity of each buffer depends on the reshape operation.

14. The system of claim 10, wherein the constraint based solver is programmed with a second set of one or more constraints.

15. A non-transitory computer program product storing instructions that, when executed by at least one programmable processor, cause the at least one programmable processor to:

transmit, to a reshape solver, an input tensor with an input tensor shape and an output tensor with an output tensor shape;

receive, from the reshape solver, data identifying chunks of tensor data to be moved within memories of a hardware accelerator, a source computing unit on the hardware accelerator from where each corresponding chunk is to be moved, and a target computing unit on the hardware accelerator to where each corresponding chunk is to be moved;

transmit, to a constraint based solver, the received data, a number of computing units within the hardware accelerator, and a maximum number of time steps over which a reshape operation is to be performed;

receive, from the constraint based solver, a schedule based on the received data, the number of computing units within the hardware accelerator, and the maximum number of time steps, the schedule indicating routes for transferring the chunks of tensor data between the memories of the hardware accelerator;

updating the schedule by removing cyclical routes or merging chunks moving over a single route or both to generate an updated schedule;

compile the updated schedule to generate compiled data; and transmit the compiled data to the hardware accelerator.

16. The non-transitory computer program product of claim 15, wherein the at least one programmable processor is configured to update the received data to remove one or more chunks for which the source computing unit and the target computing unit are adjacently arranged within the hardware accelerator, the updating being performed subsequent to the receiving from the reshape solver of the received data and prior to the transmitting to the constraint based solver of the received data.

* * * * *